United States Patent [19]

O'Rell et al.

[11] 4,228,225
[45] Oct. 14, 1980

[54] BATTERY SEPARATOR

[75] Inventors: Dennis D. O'Rell, Boxboro; Nan J. Lin, Burlington, both of Mass.

[73] Assignee: W. R. Grace & Co., Cambridge, Mass.

[21] Appl. No.: 51,175

[22] Filed: Jun. 22, 1979

[51] Int. Cl.$^2$ .............................................. H01M 2/18
[52] U.S. Cl. .................................................... 429/147
[58] Field of Search ................................ 429/147, 146

[56] References Cited
U.S. PATENT DOCUMENTS

| | | | |
|---|---|---|---|
| 4,072,802 | 2/1978 | Murata et al. | 429/147 |
| 4,153,759 | 5/1979 | Murata et al. | 429/147 |

*Primary Examiner*—Anthony Skapars
*Attorney, Agent, or Firm*—Edward J. Hanson, Jr.; C. Edward Parker

[57] ABSTRACT

A battery separator embossed with a configuration that is neither vertical corrugation or vertical rib and yet in which all of the surface areas of the two separator faces open or slant upwardly except the portions actually directly engaged against a battery plate. Thus all intended recesses in the faces of the battery separator are open at their upper extremity so that no gas can be trapped by the configuration of the battery separator embossment. Additionally the division portions between the embossed recesses on the positive plate engaging face are in continuous engagement with the positive battery plate from the bottom of the plate to the top of the plate which provides stability to the raised areas of the battery separator that engage the negative battery plate.

29 Claims, 12 Drawing Figures

FIG. 6
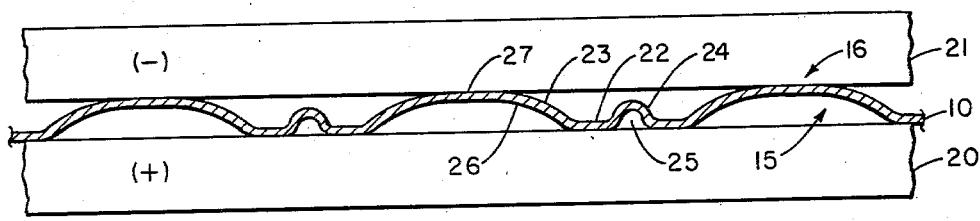
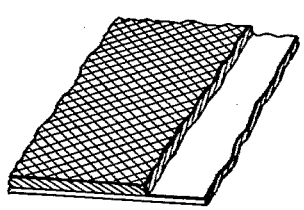
FIG. 7
PRIOR ART
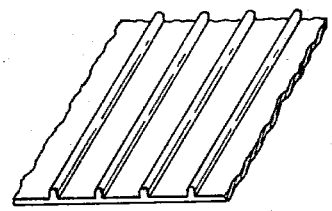
FIG. 8
PRIOR ART
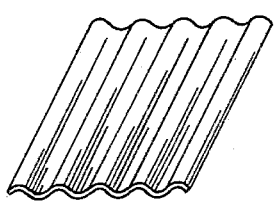
FIG. 9
PRIOR ART
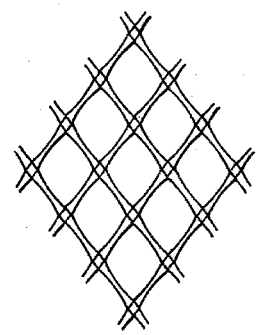
FIG. 10
PRIOR ART

4,228,225

BATTERY SEPARATOR

BACKGROUND OF THE INVENTION

This invention relates generally to battery separators and more especially to battery separators for lead-acid batteries.

Conventional separators used in lead-acid storage batteries have been provided with spacers such as glass mats (see FIG. 7), armour ribs (see FIG. 8) and projections in order to have enough electrolyte maintained between the negative and positive plate, to retard active material shedding in positive plates and to retard active material expansion in negative plates. The spacers add additional cost to the battery separator, therefore, such a storage battery has been high in cost. Corrugated type separators (FIG. 9) are also known and have some advantage in that they do not require extra, special spacing structure. However, corrugated type separators can only be used with rigid separator materials. For thin thermoplastic sheets, the corrugated type separators do not usually offer enough rigidity to withstand the pressure from the positive and negative plates and prevent negative material expansion.

The battery separator shown in FIG. 10 is that of U.S. Pat. No. 4,072,802 and its continuation U.S. Pat. No. 4,153,759. This battery separator overcomes some of the defects mentioned above. However, during embossment it proved necessary to at least partially melt the projecting parts, rendering them filmy and clogging the pores increasing electrical resistance. The channels providing for gas relief are side channels below the apex or vertically highest point of the embossments on the battery separator face when the battery separator is engaged in a battery. Thus gas can lodge below the embossments. Even if the embossments were to be medially penetrated, which they are not, to release the gas, a 0° from the horizontal point would always exist at the bottom of any wall that did not extend all the way to the bottom of the battery separator face and a gas bubble could lodge below this point and linger there cutting off effective battery plate surface. Additionally because neither face of the battery separator of FIG. 10 has a continuous engagement with a battery plate from the top to the bottom of the battery separator face the embossed configuration retention is not as stable.

The present invention overcomes the above defects and gives battery separators having ideal characteristics.

One object of the present invention is to provide a high performance battery separator formed from a small pored, thin thermoplastic sheet.

Another object of the present invention is to provide a storage battery of a high performance and long life.

Yet another object of the present invention is to provide a battery separator that is easy to make and low in cost.

A still further object of the present invention is to provide a battery separator that has the lowest possible electrical resistance and the best possible gas relief characteristics.

SUMMARY OF THE INVENTION

By an aspect of the invention a battery separator is provided that is a porous sheet and has at least one positive plate engaging face having a top and a bottom and at least one negative plate engaging face having a top and a bottom. The porous battery separator sheet is embossed providing a reverse configuration of embossment of the positive engaging face and the negative plate engaging face. Essentially all of the embossment walls open continuously upwardly in the battery plate engagement areas.

In other special aspects of the battery separator of the present invention essentially all of the embossment walls open continuously upwardly with an angle of at least 20° from the horizontal, all restrictions to upward gas movement are penetrated substantially medially, the battery separator is substantially open pored throughout and free of filmy areas and there are a plurality of division portions on the positive plate engaging face. The division portions form the outer extremity of the positive plate engaging face and lie in a plane in which they are at least 75% continuous in extending in the plane from the bottom to the top of the positive plate engaging face.

By another aspect of the present invention the battery separator has a plurality of series of interconnected recessed areas on at least one of its plate engaging faces with each of the series opening from the bottom of a battery plate engaging face to the top of the battery plate engaging face. Each of the series has a plurality of wide recesses. Each of the wide recesses has a width of about 1.5 to about 25 mm and a depth of about 0.125 to about 4 mm. Each of the series also has a plurality of narrow recesses each of which has a width of less than about ⅓ the width of the wide recesses. The narrow recesses interconnect two vertically displaced wide recesses from the vertically upper most extremity of the vertically lower wide recess. All of the surfaces of the wide and the narrow recesses slant to the top of the battery plate engaging face.

In other special aspects of the battery separator of the present invention essentially all recess surfaces slant to the top of the porous sheet with an angle of at least 20°, all restrictions are penetrated substantially medially and the porous sheet is substantially open pored throughout and substantially free of filmy areas.

By yet another aspect fo the present invention a battery separator is provided having a battery plate engaging face with a top and a bottom, and a plurality of raised spacing members that extend from the bottom to the top of the battery plate engaging face adjacent to one another. The outer extremities of the spacing members lie in a plane, are sinusoidal like in configuration in the plane and at least 75% continuous in the plane in extension from the bottom to the top of the battery separator face. Each spacing member is isolated in the plane from the adjacent raised spacing members.

By another aspect of the present invention an improved battery separator is provided comprising a sheet comprised of thermoplastic resin and acid resistant porous inorganic filler. The sheet has a thickness of less than 1.0 mm and embossed parts projecting outwardly more than 0.25 mm. The embossed parts extend in a plane for a linear distance of at least 2 cm and are shaped to enclose at least one area in the plane of less than 4 cm$^2$. The enclosed area has at least two relief gap means oriented vertically above one another when the battery separator is placed in operable position in a battery cell. The relief gap means is of sufficient depth and width to allow gas relief from the enclosed area when it is closed by a battery plate.

DESCRIPTION OF THE DRAWINGS

FIG. 6 is an enlarged vertical sectional view of a small portion of a storage battery illustrating the battery separator engaged between a positive battery plate and a negative battery plate.

FIGS. 7, 8, 9 and 10 are perspective views of prior art battery separators.

DESCRIPTION OF THE PREFERRED EMBODIMENT

Figure 1:
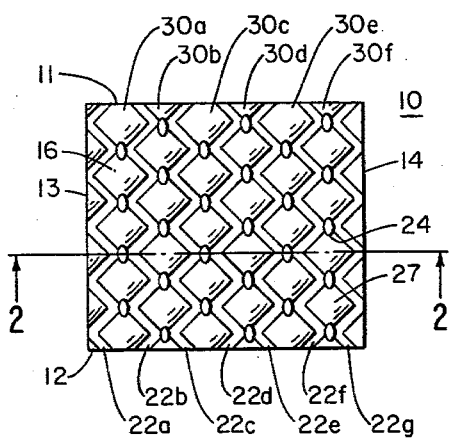
FIG. 1 is a plan view of a portion of the negative plate engaging face of the battery separator of the present invention drawn to approximate scale.
Figure 3:
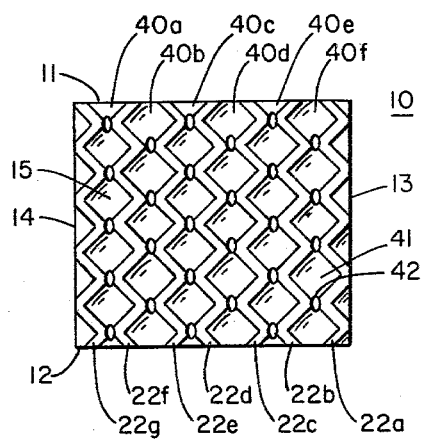
FIG. 3 is a plan view of a portion of the positive plate engaging face of the battery separator of the present invention drawn to approximate scale.
Figure 2:
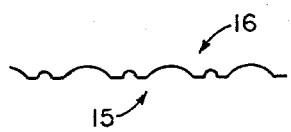
FIG. 2 is a section view on line 2—2 of FIG. 1 of a portion of the battery separator of the present invention drawn to approximate scale.
Figure 4:
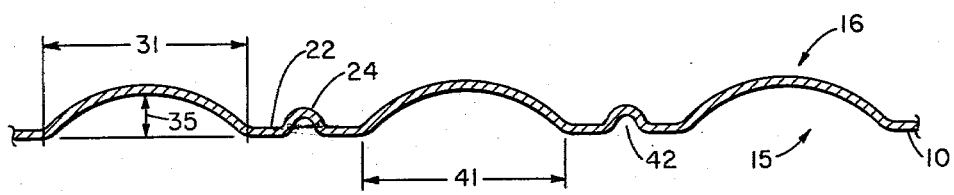
FIG. 4 is an enlarged section view similar to FIG. 2.
Figure 5A:
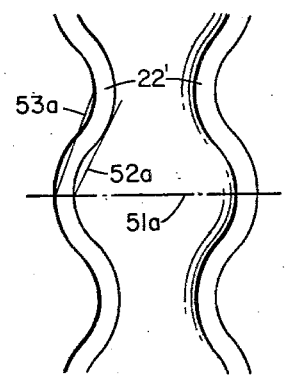
FIG. 5a is a view similar to FIG. 5 illustrating an alternate embossment configuration.
Figures 5, 5B:
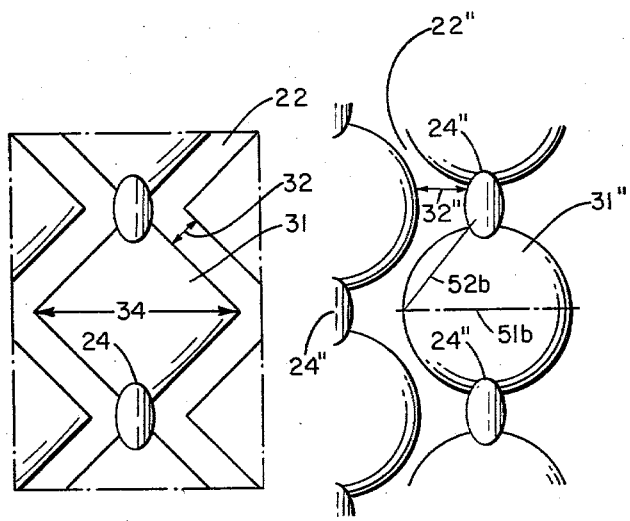
FIG. 5 is an enlarged plan view of a swatch of battery separator similar in view to FIG. 1.
FIG. 5b is a view similar to FIGS. 5 and 5a illustrating another alternate embossment configuration.

Referring to FIGS. 1 through 5, a swatch from a battery separator of the present invention is shown by way of illustration. FIGS. 1, 2 and 3 are substantially to scale while FIGS. 4 and 5 are blown up for a clear description of parts. Treating the swatch of FIGS. 1, 2 and 3 as a complete battery separator; a battery separator 10 is shown formed from a porous sheet and having a top 11, a bottom 12, a left side 13, a right side 14, a positive plate engaging face 15 and a negative plate engaging face 16. The porous sheet is embossed providing a reverse configuration of embossment on its opposite faces as shown in FIG. 2. Essentially all of the embossment walls continuously slant and open upwardly toward the top of the battery separator in the battery plate engagement areas of the faces 15 and 16 of the separator. By top and bottom of the battery separator it is meant the top and bottom of the vertical axis of the battery separator when positioned for use. The top and/or bottom could, of course, be cut or formed on a bias.

The term embossed wall is considered to be those surfaces of either battery separator face that are not in direct impingement with a battery plate surface but that are within the area of coverage or engagement with the battery plate. Thus looking at FIG. 6 the portions of the porous sheet battery separator 10 that are not shown engaged with the positive battery plate 20 or the negative plate 21 of a lead acid battery are embossed walls. These are portions such as 22, 23, 24, 25 and 26. The term embossed wall in this application does not cover the portion 27 even if it is pressed upon by the battery plate with sufficient force to slightly bulge in at its center portion losing contact with battery plate 21 in the collapsed area. Essentially all of the embossment walls open upwardly to the top of the porous sheet, preferably with an angle of at least 20°, more preferably at least 40° when the sheet is installed in operable upright position in a battery. The angle is to be read from the horizontal. Thus a vertical line would be 90°. All restrictions, that is to say barriers, are preferably penetrated substantially medially to provide for the best possible gas passage to the top of the battery.

Looking in particular to FIGS. 1 and 3 it may be seen that the embossed walls define a plurality of series, 30a; 30b; 30c; 30d; 30e and 30f of interconnected land areas 31 (FIG. 5) on the negative plate engaging face of the porous sheet. A land area or base land area 31 is the entire raised area shown in FIGS. 4 and 5, minus the interconnecting land area 24. Each series of interconnected land areas, for example 30a and 30b, are separated by a division portion 22 as shown in FIGS. 1–22a; 22b; 22c; 22d 22e; 22f and 22g. The division portions can be seen to slant upwardly at an angle of 45° from the horizontal. Thus the upward slant or angle of the wall where the division meets with a battery plate would be 45° from the horizontal.

Each series 30 of interconnected land areas extends from the bottom 12 of the battery separator 10 to the top 11 of the battery separator. Preferably each series of interconnected land areas contains at least 5 base land areas 31. Each base land area has an area of 0.3 cm$^2$. The preferred base land area is 0.025 to 4 cm$^2$, more preferably 0.1 to 3.0 cm$^2$. The nominal width 34 of each base land area is 5 mm. The preferred width is 1.5 to 25 mm more preferably 3 to 12 mm. The nominal height 35 of each base land area is 1.15 mm. The preferred height is 0.125 to 4 mm, more preferably 0.25 to 3 mm. Each base land area 31 is connected to the vertically adjacent base land area in the interconnected series by an interconnecting land area that is preferably less than $\frac{3}{4}$ the width of the base land area. The interconnecting land areas 24 has an extreme height of 0.5 mm. The preferred height is 0.125 to 4 mm, more preferably 0.25 to 3 mm.

Each series 30 of interconnected land areas is separated from the others by a division 22 that is 1.62 mm wide. The perferable width 32 is less than 25 mm at the furthest departure of the adjacent series, more preferably less than 5 mm. The battery separator 10 perferably has a porous sheet thickness of less than 1 mm, preferably a sheet thickness of 0.025 to 1 mm thick, more preferably 0.1 to 1 mm thick. The embossed battery separator thickness was 1.4 mm. The preferred thickness is 0.8 to 5 mm. It is important to the preferred form of the present invention that the porous sheet and thus the battery separator remain substantially porous throughout, even in the area of the division 22. The area of the divisions is the most severly compacted and thus the pores are slightly reduced in aggregate size but the thermoplastic is not fused or made filmy. If the pores are closed the ER of the separator is, of course, increased.

The battery separator 10 has a greater amount of raised surface area on the negative plate engaging face 16 than the positive plate engaging face 15. The term "raised surface area" on the negative plate engaging face 16 means all of the area in the base land area 31 plus all of the area in the interconnecting land area 24. The "raised surface area" on the positive face 15 means the divisions 22. The battery separator has about 81 base land areas per 100 cm$^2$. Preferably there are at least 16 base land areas per 100 cm$^2$, more preferably at least 50 base land areas per 100 cm$^2$. The base land areas preferably constitute at least 25% of the negative plate engaging face, more preferably at least 50%. The surface engagement with the negative plate is about 15–20%.

The positive battery plate engaging face 15 of the battery separator 10 has a plurality of series of interconnected recessed areas (FIG. 3) 40a; 40b; 40c; 40d; 40e and 40f each of which opens from the bottom 12 to the top 11 of the porous sheet battery separator face. Each interconnected recessed area consists of a plurality of wide recesses 41 (see also FIG. 4) and a plurality of narrow recesses 42. Each of the wide recesses has a width of 5 mm. The preferred width is 1.5 mm to 25 mm, more preferably 3 to 12 mm. Each of the connecting narrow recesses 42 are 0.5 mm wide. Each of the narrow recesses should have a preferred width of less than about ¾ the width of the wide recesses 41. It may be observed that the dimensions of the land areas and recesses are given as identical. While there is obviously some difference, the difference is small enough to be insignificant in making measurements. Each of the narrow recesses interconnects two vertically displaced wide recesses 41 with the lower of the two wide recesses being opened from or through its vertically upper most extremity. The width of the recesses is to be measured horizontally with the battery plate engaging face oriented in its operable upright vertical position. It is this width that should be sufficiently narrow to provide the sheet with crush resistance so that the embossed shape will be substantially retained in use.

It should be observed that no lengths, vertical distances or heights have been given for the recesses or land areas when the battery separator plate engaging faces are in their in-use position. While the preferred lengths generally fall within the width parameters, this dimension is less critical. The length could be greater than the preferred limits indicated for the widths without a great loss in shape stability during use. It is also clear that the length of the narrow interconnecting recesses or land areas can be so small as to be unmeasurable, just being the separation between the wide recesses. Furthermore while the description and claims designate two wide recesses or land areas joined by a narrow recess or land area, the widths of each may be varied. Thus a wide recess 1.5 mm wide may be connected to a wide recess 2 mm wide by three aligned narrow recesses 0.5 mm, 0.3 mm and 0.5 mm wide respectively. For computation for claim purposes if any combination of interconnected recesses or land areas would allow the claim to read on it then the claim applies.

All of the surfaces of the wide and the narrow recesses are upwardly slanting and opening when engaged with the positive battery plate. Of course, there could be a series of interconnecting wide and narrow recesses of varying dimensions rather than of repeating uniform dimension as shown for purposes of illustration in the present invention. Essentially all recess surfaces slant to the top of the porous battery separator sheet with an angle of at least 20°, more preferably at least 40°, from the horizontal axis. The series of interconnected recessed areas are preferably separated from one another by less than 25 mm at their furthest departure, more preferably less than 2 mm. The actual separation is 1.62 mm.

Looking in particular at FIGS. 3 and 4, it may be observed that adjacent division portions such as 22a and 22b form restrictions or barriers where they most closely approach each other and that the barriers are penetrated by the narrow recesses 42. The narrow recesses 42 need not be of separate formation in anyway but can simply be restrictions or flowing inwardly of the same walls forming the wider recesses 31.

The positive plate engaging face of the battery separator has less raised surface area than the negative plate engaging face. The interconnected recessed areas are separated from one another by less than 25 mm, more preferably 2 mm, at their furthest departure. The wider recesses each have an area of 0.3 cm². The preferred area is 0.025 to 4 cm², more preferably 0.1 to 3.0 cm². The wide recesses have an extreme depth of 1.15 mm. The preferred depth is 0.125 to 4 mm, more preferably 0.25 to 3 mm. There are about 81 recesses per 100 cm², preferably there are at least 16, more preferably 50, wide recesses per 100 cm², and the wide recesses constitute at least 25%, more preferably 50%, of the negative plate engaging face.

Looking once again at FIG. 3 it may be seen that the divisions 22 form a plurality of raised spacing members divisions 22a; 22b; 22c; 22d; 22e; 22f and 22g extending from the bottom to the top of the battery plate engaging face 15 adjacent to one another. Each of the spacing members has an outer extremity lying in a plane (FIGS. 2 and 3), that is sinusoidal like in configuration in the plane and 100% continuous in the plane in extension from the bottom to the top of the battery separator face and isolated in the plane from adjacent raised spacing members. The continuity of the spacing members in extension from the bottom to the top of the battery separator face is preferably at least 75%, more preferably 90%. The peaks of the adjacent sinusoidal like raised spacing members are aligned to form wide spaces and narrow spaces between the adjacent sinusoidal like raised spacing members. The wide spaces are formed with a rounded configuration presenting the corresponding rounded projection on the face of the battery separator opposite the sinusoidal like spacing means and accordingly no more than 50% of either of the faces is engaged with a battery plate when the battery separator is in use and all non-engaging surface areas of both of the faces are open from their vertical extremity when oriented for use.

The raised spacing members or divisions can be rounded where they change direction rather than having the sharp turn configuration of the diamond configuration illustrated. Many other configurations could obviously also be used such as parts of circles, rhomic shapes and elliptical shapes, etc. The provision of a substantially continuous contact with the positive battery plate from the top of the battery separator face to the bottom of the battery separator face yield a great deal of stability to the maintenance of the embossed shape without either spread or torsional distortion when the battery separator is in use. This improves the isolation and individual integrity of each base land area. This good area of contact also helps minimize the shedding of battery plate active material.

To compute the angle of incline for the non-circular curved division member 22' or the circular curved division member 22" the recess or embossed land area should be cut in half horizontally as shown in FIG. 5a and 5b with lines 51a and 51b respectively. Uneven shapes can also be so cut with half their area above the line and half below the line. Then lines 52a and 52b respectively should be drawn from where the bisecting lines 51a and 51b respectively meet the division portion and the first engagable inside edge of the passage or interconnecting land area 24' and 24" respectively upwardly out of the recess or from the land area at the vertically upper terminus thereof. The angle of line 52a or 52b from the horizontal is then the angle of upward incline by definition for purposes of determining the angle inside the embossed walls of curved division members 22' and 22". For purposes of determining the angle outside the embossment walls of curved division member 22' line 53a is drawn from where bisecting line 51a meets the outside edge of the division member 22' to where the outside edge of the division changes direction as indicated and the angle of this line is measured from the horizontal. The width of the division in FIG. 5b at its furthest departure from adjacent series is shown at 32". This is the distance of a series of land areas 24"–31" from the adjacent series of land areas 24"'–31"'.

Turning now to a brief description of the preferred composition of the battery separator, the battery separator is preferably comprised of thermoplastic polymer and acid resistant inorganic filler. Preferred compositions include 20 to 75% more preferably 30 to 60%, thermoplastic polymer, and 25 to 80%, more preferably 30 to 75% acid resistant inorganic filler. The preferred thermoplastic polymer is a resin containing at least one resin selected from the group consisting of polymers or copolymers containing ethylene, propylene, butylene, vinyl chloride and styrene. The more preferred polymer would contain at least 50% ethylene. The preferred composition would generally contain additional materials such as plasticizer, oil, stabilizers, wetting agents and the like. The battery separator is preferably formed with a porous sheet that is of homogeneous composition throughout its embossed thickness. The pores are small pores, generally between 0.01 to 15 microns in diameter. The sheet may be a film, fiberous, sintered particulate or of another structure.

Looking at FIG. 6 a section of a battery having a positive plate 20 and a negative plate 21 may be seen with a battery separator 10 of the present invention in operable position. It is preferred that the face 15 having the recesses 41 be engaged against the positive plate 20 and that the face 16 having the land areas 31 be engaged against the negative plate and the preferred embodyment has been discussed from this perspective. However, the battery separator's performance is almost equal when the battery separator faces are reversed and the face 15 engages the negative plate 21 and the face 16 engages the positive plate 20. While such a use is permissable the use of the battery separator with the vertical axis of its face in a horizontal disposure is not permissable and such a use would be unsatisfactory.

The battery separator can be folded under a battery plate so that it presents a plate engaging face to both sides of the plate. Thus in a battery every positive plate could be positioned in a folded separator and the negative plates simply positioned between 2 composite assemblies of positive plate and folded separator. No additional separator would be required. In addition the separator of the present invention particularly lends itself to being formed into an envelope by, for example, the method of U.S. Pat. No. 4,092,386 or other known procedures.

Two battery separators of the present invention were formed in the configuration shown in the drawings as described in the following Examples.

EXAMPLE I

A microporous filled polyethylene sheet of battery separator material sold under the trademark DARAMIC by W. R. Grace & Co. as 10 mil (0.25 mm) flat battery separator sheet and manufactured according to U.S. Pat. No. 3,351,495 was embossed as follows:

The sheet was preheated by passing it through an oven maintained at 90° C. for a distance of 4 feet at the rate of 15 feet/min. and passing the thus heated sheet between an engraved steel roll and a rubber roll under a pressure of 36 kg/linear cm. The steel roll was maintained at 105° C. and the rubber roll was at ambient.

The steel roll was engraved with depressions corresponding to land areas 31 (FIG. 5) that were 0.3 $cm^2$ in area, 1.8 mm in depth, 5 mm wide with an interconnecting relief land area 24 having a depth of 0.9 mm and a width of 1.6 mm.

The embossed battery separator was then cooled to set the embossment. The embossed separator had the configuration described under the section of this application entitled "Description of the Preferred Embodiment". The battery separator's compressibility was 0.1 mm under a pressure of 2.1 $kg/cm^2$. No filmy areas were observed by the naked eye. The electrical resistance was 7.8 milliohms. $in^2$ measured in battery grade sulfuric acid at a specific gravity of 1.250 at 27° C. by a DC bridge circuit ER tester after 10 minutes boiling in water and a 20 minute soak in acid.

EXAMPLE II

A fiberous small pored filled synthetic pulp battery separator sheet containing 44% polyethylene prepared substantially according to Example 1 of U.S. Ser. No. 935,280, assigned to the same assignee as the present application, 0.30 mm thick was embossed as in Example I except the rate of passage was 3 feet/min.

The embossed battery separator had the configuration and compressibility of the battery separator of Example I, was also free of filmy areas observably to the unaided eye and had an electrical resistance of 8.2 milliohms, tested as in Example I except the samples were prepared by soaking for twenty minutes in sulfuric acid having a specific gravity of 1.250 at 27° C. in a beaker, then the beaker with the samples was placed in a chamber and full vacuum was drawn for thirty minutes before the test rather than being boiled in water and soaked in acid.

It will be obvious to those skilled in the art that various changes and modifications may be made in the invention without departing from its true spirit and scope. It is, therefore, aimed in the appended claims to cover all such equivalent variations as fall within the true spirit and scope of the invention.

We claim:

1. In a battery separator comprising a porous sheet having at least one positive plate engaging face having a top and a bottom and at least one negative plate engaging face having a top and a bottom, said sheet being embossed to provide a reverse configuration of embossment on said positive plate engaging face and said negative plate engaging face, the improvement comprising having essentially all embossment walls opening continuously upwardly in the battery plate engagement areas and at least some of said embossment walls formed into a configuration angled from the vertical and comprising gas impeding restrictions on at least one of said faces, all restrictions being penetrated from their lower surface at its upper extremity.

2. The battery separator of claim 1 wherein essentially all embossment walls open continuously upwardly with an angle of at least 20° from the horizontal.

3. The battery separator of claim 1 comprising a plurality of division portions on one of the plate engaging faces, said division portions forming the outer extremity of said one plate engaging face and lying in a plane and being at least 75% continuous in extending in said plane from the bottom to the top of said plate engaging face.

4. The battery separator of claim 3 wherein all restrictions being penetrated substantially medially and wherein essentially all embossment walls open continuously upwardly with an angle of at least 40° from the horizontal and said division portions being at least 90% continuous in extending in said plane from the bottom to the top of the first said one plate engaging face.

5. The battery separator of claim 1 wherein the battery separator is substantially open pored and free of filmy areas throughout those portions encompassed by the positive plate engaging face and negative plate engaging face and there is a greater amount of raised surface area on the negative plate engaging face than the positive plate engaging face.

6. The battery separator of claim 1 wherein said porous sheet is comprised of about 20 to about 75% thermoplastic polymer, has a maximum sheet thickness of less than about 1.0 mm and an embossed battery separator thickness of less than about 5 mm.

7. The battery separator of claim 6 wherein said porous sheet remains porous throughout after embossment and is comprised of about 25 to about 80% inorganic filler.

8. The battery separator of claim 1 wherein said embossed walls define a plurality of series of interconnected land areas on one of said plate engaging faces, each of said series extending from the bottom to the top of said plate engaging face; being separated from adjacent series by less than 25 mm at their furthest departure; containing at least 5 base land areas, each base land area having an area of about 0.025 to about 4 cm$^2$, a width of about 1.5 to about 25 mm and an extreme height of about 0.125 to about 4.0 mm and containing interconnecting land areas, each interconnecting land area having an extreme height of about 0.125 to about 4 mm and each of said base land areas that is adjacent to another base land area in the same series being interconnected by at least one interconnecting land area.

9. The battery separator of claim 8 wherein said porous sheet is comprised of a thermoplastic synthetic resin, is about 0.025 to about 1 mm thick and has at least 16 base land areas per 100 cm$^2$, and said base land areas constitute at least about 25% of said one plate engaging face.

10. The battery separator of claim 4 wherein said porous sheet is comprised of about 30 to about 60% thermoplastic polymer, and about 30 to about 75% inorganic filler and is about 0.1 to about 1.0 mm thick, said embossed walls define a plurality of series of interconnected land areas on the other said plate engaging face, each of said series containing at least 5 base land areas, each said base land area having a width of about 3 to about 12 mm, an extreme height of about 0.25 to about 3.0 mm and being connected to the vertically adjacent base land area in the interconnected series by an interconnecting land area less than about ⅔ the width of the base land area, said interconnecting land areas have an extreme height of about 0.25 to about 3 mm, said series of interconnected land areas being separated from one another by less than about 5 mm at their closest disposure and said one plate engaging face having at least 50 base land areas per 100 cm$^2$, and said base land areas constituting at least about 50% of said one plate engaging face.

11. The battery separator of claim 9 wherein said thermoplastic resin contains at least one resin selected from the group consisting of polymers or copolymers containing ethylene, propylene, butylene, vinyl chloride and styrene.

12. The battery separator of claim 2 positioned in a lead acid storage battery between a positive and a negative plate with the negative plate engaging face engaged with said negative plate and said positive plate engaging face engaged with said positive plate.

13. A battery separator comprising a porous sheet having at least one positive battery plate engaging face having a top and a bottom and at least one negative battery plate engaging face having a top and a bottom; a plurality of series of interconnected recessed areas on at least one of said plate engaging faces, each of said series opening from the bottom of said one battery plate engaging face to the top of said one battery plate engaging face and comprising a plurality of wide recesses each of which has a width of about 1.5 to about 25 mm and a depth of about 0.125 to about 4.0 mm and a plurality of narrow recesses each of which has a width of less than about ⅔ the width of said wide recesses, at least one of said narrow recesses interconnecting two vertically displaced said wide recesses from the vertically upper most extremity of the vertically lower wide recess.

14. The battery separator of claim 13 wherein all recess surfaces of said wide and said narrow recesses slant to the top of said one battery plate engaging face.

15. The battery separator of claim 14 wherein essentially all recess surfaces slant to the top of said one battery plate engaging face with an angle of at least 20° and all restrictions are penetrated substantially medially, said battery separator being substantially open pored throughout and substantially free of filmy areas.

16. The battery separator of claim 13 wherein there is less raised surface area on the positive plate engaging face than the negative plate engaging face.

17. The battery separator of claim 14 wherein said porous sheet is comprised of about 20 to about 75% thermoplastic polymer and about 25 to about 80% inorganic filler and has a maximum sheet thickness of less than about 1 mm and an embossed battery separator thickness of about 0.8 to about 5 mm.

18. The battery separator of claim 14 wherein said series of interconnected recessed areas are separated from one another by less than about 25 mm at their furthest departure.

19. The battery separator of claim 18 wherein said wider recesses each have an area of about 0.1 to about 3 cm$^2$, a width of about 3 to about 12 mm and an extreme depth of about 0.25 to about 3 mm and wherein there are at least about 16 wide recesses per 100 cm$^2$.

20. The battery separator of claim 19 wherein said porous sheet is comprised of about 30 to about 60% thermoplastic polymer, and about 30 to about 75% inorganic filler and is about 0.1 to about 1 mm thick said series of interconnected land areas are separated from one another by less than about 5 mm at their closest disposure, and said wide recesses constitute at least about 25% of said one plate engaging face.

21. The battery separator of claim 20 wherein said thermoplastic polymer contains at least one resin selected from the group consisting of polymers or copolymers containing ethylene, propylene, butylene, vinyl chloride and styrene, and said porous sheet is about 0.1 to about 1.0 mm thick and has at least about 50 wide recesses per 100 cm$^2$, and said wide recesses constitute at least about 50% of said one plate engaging face.

22. The battery separator of claim 21 positioned in a lead acid storage battery between a positive and a negative plate with the negative plate engaging face engaged with said negative plate and said positive plate engaging face engaged with said positive plate.

23. In a battery separator having a battery plate engaging face with a top and a bottom, the improvement comprising a plurality of raised spacing members that extend from said bottom to said top of said battery plate engaging face adjacent to one another, each of said spacing members having an outer extremity lying in a plane, being sinusoidal like in configuration in said plane, at least 75% continuous in said plane in extension from said bottom to said top of said battery separator face and isolated in said plane from adjacent raised spacing members.

24. The battery separator of claim 23 wherein said raised spacing members are at least 90% continuous in said plane in extending from said bottom to said top of said battery separator.

25. The battery separator of claim 24 wherein said peaks of adjacent sinusoidal like raised spacing members are aligned to form wide spaces and narrow spaces between said adjacent sinusoidal like raised spacing members.

26. The battery separator of claim 25 wherein there is another battery plate engaging face opposite the first said battery plate engaging face and said wide spaces are formed with a rounded configuration presenting a corresponding rounded projection on said opposite face and wherein no more than 50% of either of said faces is engaged with a battery plate when said separator is in use and all non engaging surface areas of both of said faces are open from their vertical extremity when oriented for use.

27. The battery separator of claim 7 wherein said porous sheet is of homogeneous composition throughout its embossed thickness.

28. An improved battery separator comprising a sheet comprised of thermoplastic resin and acid resistant porous inorganic filler, having a thickness of less than 1.0 mm and having embossed parts projecting outwardly more than 0.25 mm, said embossed parts extending in a plane for a linear distance of at least 2 cm and being shaped to enclose at least one area in said plane of less than 4 cm$^2$, said enclosed area having at least two relief gap means oriented vertically above one another when said battery separator is placed in operable position in a battery cell, said relief gap means of sufficient depth and width to allow gas relief from said enclosed area when said area is closed by a battery plate.

29. The battery separator of claim 28 wherein said enclosed area has a shape selected from the group consisting of circular, diamond, rhombic and elliptical.

* * * * *

REEXAMINATION CERTIFICATE (1319th)

United States Patent [19]

O'Rell et al.

[11] B1 4,228,225

[45] Certificate Issued  Jul. 3, 1990

[54] BATTERY SEPARATOR

[75] Inventors: Dennis D. O'Rell, Boxboro; Nan J. Lin, Burlington, both of Mass.

[73] Assignee: W. R. Grace & Co-Conn, Cambridge, Mass.

Reexamination Request:
No. 90/001,736, Mar. 27, 1989

Reexamination Certificate for:
Patent No.: 4,228,225
Issued: Oct. 14, 1980
Appl. No.: 51,175
Filed: Jun. 22, 1979

[51] Int. Cl.$^5$ .............................................. H01M 2/18
[52] U.S. Cl. ..................................... 429/147; 429/254
[58] Field of Search ............... 429/147, 146, 143, 254, 429/136

[56] References Cited

U.S. PATENT DOCUMENTS 686,886  11/1901  Chamberlain .
717,549   1/1903  Decker et al. .
3,045,058  7/1962  Martinak .......................... 429/254 X
4,143,218  3/1979  Adams et al. ........................ 429/254
4,153,759  5/1979  Murata et al. ...................... 429/147

FOREIGN PATENT DOCUMENTS 0592140  2/1934  Fed. Rep. of Germany .
1105487  3/1968  United Kingdom .

*Primary Examiner*—Anthony Skapars

[57] ABSTRACT

A battery separator embossed with a configuration that is neither vertical corrugation or vertical rib and yet in which all of the surface area of the two separator faces open or slant upwardly except the portions actually directly engaged against a battery plate. Thus all intended recesses in the faces of the battery separator are open at their upper extremity so that no gas can be trapped by the configuration of the battery separator embossment. Additionally the division portions between the embossed recesses on the positive plate engaging face are in continuous engagement with the positive battery plate from the bottom of the plate to the top of the plate which provides stability to the raised areas of the battery separator that engage the negative battery plate.

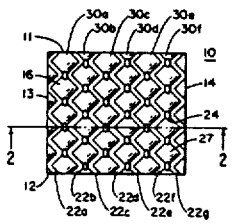

REEXAMINATION CERTIFICATE ISSUED UNDER 35 U.S.C. 307

THE PATENT IS HEREBY AMENDED AS INDICATED BELOW.

Matter printed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-22 and 27-29 is confirmed.

Claim 23 is determined to be patentable as amended.

Claims 24-26, dependent on an amended claim, is determined to be patentable.

New claims 30-36 are added and determined to be patentable.

23. In a battery separator having a battery plate engaging face with a top and a bottom, the improvement comprising *the separator being thin, porous throughout and formed of a thermoplastic polymer, the separator having* a plurality of *porous, integral* raised spacing members that extend from said bottom to said top of said battery plate engaging face adjacent to one another, each of said spacing members having an outer extremity lying in a plane, being sinusoidal like in configuration in said plane, at least 75% continuous in said plane in extension from said bottom to said top of said battery separator face and isolated in said plane from adjacent raised spacing members.

30. *The battery separator of claim 23 wherein the thermoplastic polymer is at least one resin selected from the group consisting of ethylene, propylene, butylene, and styrene.*

31. *The battery separator of claim 23 wherein the separator is comprised of about 20 to about 75% thermoplastic polymer and about 25 to about 80% inorganic filler.*

32. *The battery separator of claim 23 wherein the separator is capable of being folded so that it presents a plate engaging face to both sides of a battery plate.*

33. *The battery separator of claim 23 wherein the separator is capable of being formed into an envelope.*

34. *The battery separator of claim 23, wherein said thermoplastic polymer is an ethylene polymer containing at least 50% ethylene wherein the battery separator comprises of about 20-75% ethylene polymer and 25 to 80% inorganic filler.*

35. *The battery separator of claim 23 which is capable of being formed into an envelope and wherein the battery separator comprises about 20-75% of said thermoplastic polymer and 25 to 80% inorganic filler wherein said thermoplastic polymer is an ethylene polymer containing at least 50% ethylene.*

36. *In a battery separator having a battery plate engaging face with a top and a bottom and capable of being formed into an envelope, the improvement comprising the separator being thin, porous throughout and formed of a thermoplastic polymer selected from the group consisting of ethylene, propylene, butylene and styrene thermoplastic polymers, the separator having a plurality of porous non-fused and non-filming integral raised spacing members that extend from said bottom to said top of said plate and engaging face adjacent one another, each of said spacing members having an outer extremity lying in a plane, being sinusoidal like in configuration in said plane, at least 75% continuous in said plane in extension from said bottom to said top of said battery face and isolated in said plane from adjacent raised spacing members.*

* * * * *

REEXAMINATION CERTIFICATE (2251st)

United States Patent [19]
O'Rell et al.

[11] B2 4,228,225
[45] Certificate Issued  Mar. 29, 1994

[54] BATTERY SEPARATOR

[75] Inventors: Dennis D. O'Rell, Boxboro; Nan J. Lin, Burlington, both of Mass.

[73] Assignee: W. R. Grace & Co.-Conn., Lexington, Mass.

Reexamination Request:
No. 90/002,056, Jun. 18, 1990

Reexamination Certificate for:
Patent No.: 4,228,225
Issued: Oct. 14, 1980
Appl. No.: 51,175
Filed: Jun. 22, 1979

Reexamination Certificate B1 4,228,225 issued Jul. 3, 1990.

[51] Int. Cl.$^5$ ............................................. H01M 2/18
[52] U.S. Cl. ................................ 429/147; 429/254
[58] Field of Search ............... 429/147, 254, 143, 146, 429/136

[56] References Cited
U.S. PATENT DOCUMENTS

| | | | |
|---|---|---|---|
| 686,886 | 11/1901 | Chamberlain . | |
| 717,549 | 1/1903 | Decker et al. . | |
| 2,819,209 | 1/1958 | Pall et al. | 210/510 |
| 2,936,328 | 5/1960 | Sillcox et al. | 136/145 |
| 3,123,654 | 3/1964 | Malischewski | 264/126 |
| 3,274,319 | 9/2066 | Clegg | 264/126 |
| 3,351,495 | 11/1967 | Larsen et al. . | |
| 3,354,247 | 11/1967 | Zehender et al. | 264/119 |
| 3,440,108 | 4/1969 | Hefftner | 136/145 |
| 3,551,210 | 12/1970 | Bahler et al. | 136/148 |
| 3,870,567 | 3/1975 | Palmer et al. | 136/148 |
| 4,153,759 | 5/1979 | Murata et al. | 429/147 |

FOREIGN PATENT DOCUMENTS 992285  3/1965  United Kingdom .
1105487  3/1968  United Kingdom .

Primary Examiner—Anthony Skapars

[57] ABSTRACT

A battery separator embossed with a configuration that is neither vertical corrugation or vertical rib and yet in which all of the surface areas of the two separator faces open or slant upwardly except the portions actually directly engaged against a battery plate. Thus all intended recesses in the faces of the battery separator are open at their upper extremity so that no gas can be trapped by the configuration of the battery separator embossment. Additionally the division portions between the embossed recesses on the positive plate engaging face are in continuous engagement with the positive battery plate from the bottom of the plate to the top of the plate which provides stability to the raised areas of the battery separator that engage the negative battery plate.

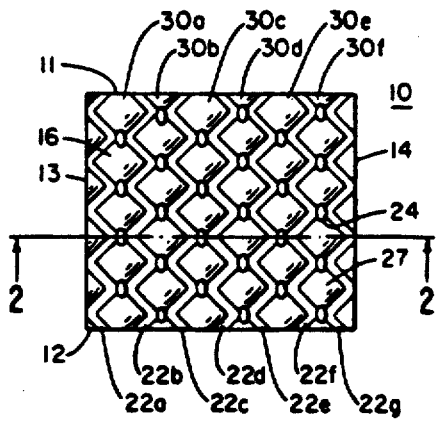

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1-22 and 27-29 is confirmed.

Claims 23-26, 30-36 are cancelled.

* * * * *